United States Patent
Marchetti

(10) Patent No.: US 11,655,855 B2
(45) Date of Patent: May 23, 2023

(54) LOCKING COUPLING FOR ROTATING ASSEMBLY

(71) Applicant: Raytheon Company, Waltham, MA (US)

(72) Inventor: Paul J. Marchetti, Dracut, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/214,463

(22) Filed: Mar. 26, 2021

(65) Prior Publication Data
US 2022/0307556 A1  Sep. 29, 2022

(51) Int. Cl.
*F16D 1/076* (2006.01)

(52) U.S. Cl.
CPC ........... *F16D 1/076* (2013.01); *Y10T 403/587* (2015.01); *Y10T 403/7033* (2015.01)

(58) Field of Classification Search
CPC .......... F16B 21/02; F16B 21/04; F16B 21/10; F16B 21/16; F16B 21/18; F16B 2200/506; F16D 1/033; F16D 1/04; F16D 1/076; F16D 1/08; F16D 1/0876; F16D 1/108; F16D 1/112; F16D 1/116; F16D 2001/103; Y10T 403/58; Y10T 403/587; Y10T 403/645; Y10T 403/7005; Y10T 403/7007; Y10T 403/7009; Y10T 403/7033
USPC ..... 403/315, 319, 337, 348, 349, 350, 359.5
See application file for complete search history.

(56) References Cited

U.S. PATENT DOCUMENTS

| 1,937,965 | A |   | 12/1933 | Johnson |            |
|-----------|---|---|---------|---------|------------|
| 2,516,472 | A | * | 7/1950  | Mackeage, Jr. | F16D 1/05 |
|           |   |   |         |         | 403/337    |
| 2,625,416 | A | * | 1/1953  | Fellows | F16D 1/076 |
|           |   |   |         |         | 403/20     |
| 2,803,474 | A | * | 8/1957  | Wilson  | F16D 1/033 |
|           |   |   |         |         | 403/336    |

(Continued)

FOREIGN PATENT DOCUMENTS

| DE | 3730728  A   | * | 4/1989 | ............. F16D 1/076 |
| DE | 4308975  A1  | * | 9/1994 | ............... F16D 1/06 |

(Continued)

OTHER PUBLICATIONS

International search report for PCT/US22/21924 dated Jul. 11, 2022.

*Primary Examiner* — Josh Skroupa
(74) *Attorney, Agent, or Firm* — Getz Balich LLC

(57) ABSTRACT

A coupling is provided that includes a shaft, a hub, a retainer and a fastener. The shaft includes a plurality of shaft splines. The shaft splines are arranged circumferentially about an exterior of the shaft. The hub includes a plurality of hub splines, a hub bore and a hub fastener aperture. The hub splines are arranged circumferentially about the hub bore. The hub splines are mated with the shaft splines. The shaft is within the hub bore. The retainer includes a plurality of retainer splines, a retainer bore and a retainer fastener aperture. The retainer splines are arranged circumferentially about the retainer bore. A first of the retainer splines circumferentially overlaps and is axially next to a first of the shaft splines. The shaft is within the retainer bore. The fastener is within the hub fastener aperture and the retainer fastener aperture. The fastener connects the retainer to the hub.

19 Claims, 17 Drawing Sheets

(56) References Cited

U.S. PATENT DOCUMENTS

| | | | | |
|---|---|---|---|---|
| 2,815,231 A * | 12/1957 | Wilson | ................... | F16D 1/076 403/335 |
| 2,821,277 A * | 1/1958 | Hughes | .................. | F16D 11/10 403/359.5 |
| 2,886,358 A * | 5/1959 | Munchbach | ............ | F16D 1/116 403/359.5 |
| 2,924,121 A * | 2/1960 | Wilson | ................... | F16D 1/076 74/661 |
| 3,524,665 A * | 8/1970 | Hohn | ..................... | F16D 1/033 403/273 |
| 4,062,571 A * | 12/1977 | Sicard | .................. | F16L 37/113 285/388 |
| 4,207,780 A | 6/1980 | Saxton | | |
| 5,085,129 A * | 2/1992 | Dugan | ................... | F16D 1/076 403/338 |
| 5,085,564 A * | 2/1992 | Naylor | ................... | F16D 1/033 464/181 |
| 6,038,936 A | 3/2000 | Butkovich | | |
| 7,753,614 B2 * | 7/2010 | Kobayashi | ............. | F16D 1/033 403/338 |
| 8,206,055 B2 | 6/2012 | Schaefer | | |

FOREIGN PATENT DOCUMENTS

| | | | | |
|---|---|---|---|---|
| DE | 4308975 C2 | 9/1998 | | |
| FR | 2963649 A1 * | 2/2012 | ............ | F16D 1/033 |
| GB | 996382 A * | 6/1965 | ............. | F16D 1/033 |

* cited by examiner

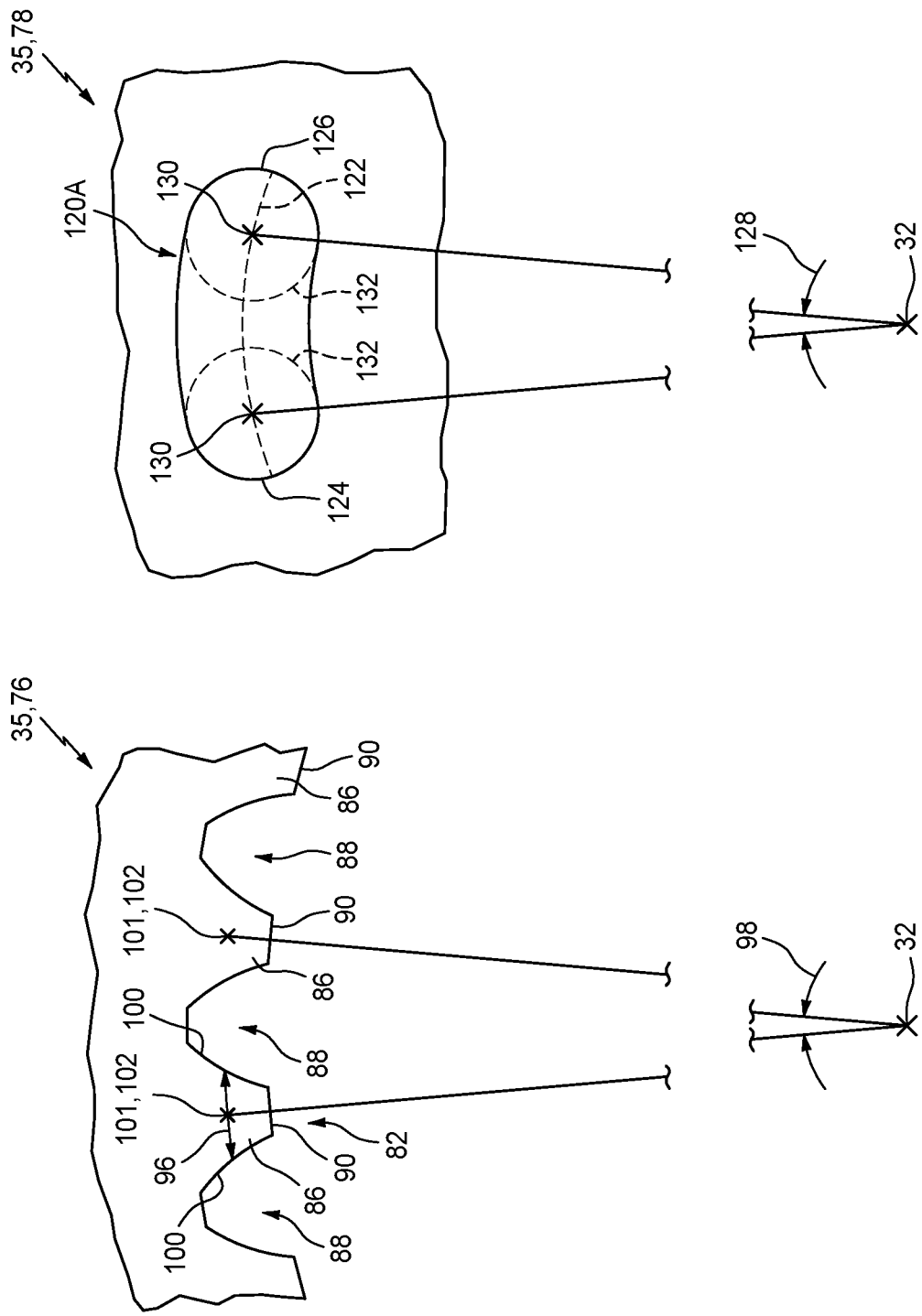

LOCKING COUPLING FOR ROTATING ASSEMBLY

BACKGROUND OF THE DISCLOSURE

1. Technical Field

This disclosure relates generally to mechanical couplings and, more particularly, to mechanically coupling splined components together.

2. Background Information

A shaft and a hub may be mechanically coupled together using a splined interface. Typically, the hub is mounted on the shaft such that internal spline teeth on the hub mesh with external spline teeth on the shaft. This meshing of the spline teeth rotationally constrain the hub to the shaft. However, without a further constraints, the internal spline teeth of the hub may move axially along the external spline teeth of the shaft. To prevent or limit such axial movement, the hub may be arranged axially between a shoulder on the shaft and a retaining ring mount on the shaft. The retaining ring is seated in a groove of the shaft. The shaft may therefore be extended an axial length out from the splined interface between the shaft and the hub in order to provide space for the groove that receives the retaining ring. While such a mechanical coupling has various benefits, there is still room in the art for improvement. There is a need in the art, for example, for an improved mechanical coupling between a hub and a shaft which can reduce an overall axial length of the coupling, increase strength and/or durability of the coupling as well as simplify assembly and disassembly without, for example, requiring specialized tools.

SUMMARY OF THE DISCLOSURE

According to an aspect of the present disclosure, a coupling is provided that includes a shaft, a hub, a retainer and a fastener. The shaft includes a plurality of shaft splines. The shaft splines extend axially along and are arranged circumferentially about an exterior of the shaft. The hub includes a plurality of hub splines, a hub bore and a hub fastener aperture. The hub splines extend axially along and are arranged circumferentially about the hub bore. The hub splines are mated with the shaft splines. The shaft is within the hub bore. The retainer includes a plurality of retainer splines, a retainer bore and a retainer fastener aperture. The retainer splines extend axially along and are arranged circumferentially about the retainer bore. A first of the retainer splines circumferentially overlaps and is axially next to a first of the shaft splines. The shaft is within the retainer bore. The fastener is within the hub fastener aperture and the retainer fastener aperture. The fastener connects the retainer to the hub.

According to another aspect of the present disclosure, a locking coupling is provided that includes a shaft, a hub, a retainer and a fastener. The shaft includes a plurality of shaft splines. The hub includes a plurality of hub splines and a hub fastener aperture. The retainer includes a plurality of retainer splines and a retainer fastener aperture. The locking coupling is configurable in a first arrangement where: the hub is mounted on the shaft, and the hub splines are meshed with the plurality of shaft splines; the retainer is mounted on the shaft, and each of the retainer splines is axially adjacent and circumferentially aligned with a respective one of the shaft splines; and the fastener is within the hub fastener aperture and the retainer fastener aperture. The locking coupling is configurable in a second arrangement where the retainer splines are meshed with the shaft splines.

According to still another aspect of the present disclosure, a manufacturing method is provided. During this method, a hub and a retainer are mounted on a shaft. During this mounting, the retainer is slid along the shaft from a retainer first position to a retainer second position. A plurality of retainer splines on the retainer are meshed with a plurality of shaft splines on the shaft at the retainer first position. The retainer splines are axially next to the shaft splines at the retainer second position. The retainer is rotated about the shaft from the retainer second position to a retainer third position where each of the retainer splines circumferentially overlaps a respective one of the shaft splines. The hub is arranged at a hub position where a plurality of hub splines on the hub are meshed with the shaft splines. The retainer is fixed to the hub with a fastener where the retainer is in the retainer third position and the hub is in the hub position. The fastener is within a retainer fastener aperture in the retainer and a hub fastener aperture in the hub.

The shaft may also include an undercut axially adjacent the shaft splines. In the first arrangement, the retainer splines may be seated within the undercut.

In the second arrangement, the fastener may be within the hub fastener aperture and the retainer fastener aperture.

The shaft may also include an undercut axially next to the shaft splines. The retainer splines may be within the undercut at the retainer second position and the retainer third position.

The fastener may be mated with the retainer fastener aperture and the hub fastener aperture prior to sliding the retainer along the shaft from the retainer first position to the retainer second position.

The retainer splines may be configured to mate with the shaft splines during at least one of assembly or disassembly of the locking coupling.

The shaft may also include a shoulder. The first of the retainer splines may be captured axially between the first of the shaft splines and the shoulder.

The shaft may also include an undercut. The retainer splines may be seated within the undercut.

The undercut may project radially into the shaft. The undercut may extend axially and circumferentially within the shaft.

The hub fastener aperture may have a circular cross-sectional geometry. The retainer fastener aperture may have a circular cross-sectional geometry.

The hub fastener aperture may have an elongated cross-sectional geometry. The retainer fastener aperture may have a circular cross-sectional geometry.

The fastener may include a head and a shaft. The shaft may project axially through the hub fastener aperture and at least partially axially into the retainer fastener aperture. The hub may be axially between and engaged with the head and the retainer.

An aperture pitch angle of the hub fastener aperture may be equal to a spline pitch angle of an adjacent pair of the retainer splines.

The retainer may also include a counterbore. The hub may also include a rim seated within the counterbore.

A first of the hub splines may have a hub spline circular tooth thickness. The first of the retainer splines may have a retainer spline circular tooth thickness that is equal to (or less than) the hub spline circular tooth thickness.

An outer periphery of the hub may have a circular cross-sectional geometry. In addition or alternatively, an outer periphery of the retainer may have a non-circular cross-sectional geometry.

The retainer may be configured for blind rotation about the shaft, axially behind the hub, between a locked position and an unlocked position. The first of the retainer splines may circumferentially overlap and may be axially next to the first of the shaft splines in the locked position. The first of the retainer splines may be circumferentially aligned with a groove between the first of the shaft splines and a second of the shaft splines in the unlocked position.

The coupling may also include a gear train that includes a carrier. The carrier may be configured as or otherwise include the hub.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 9 is a partial illustration of internal splines included in the splined hub.

FIG. 10 is an illustration of a fastener aperture included in the splined hub.

DETAILED DESCRIPTION

Figure 1:
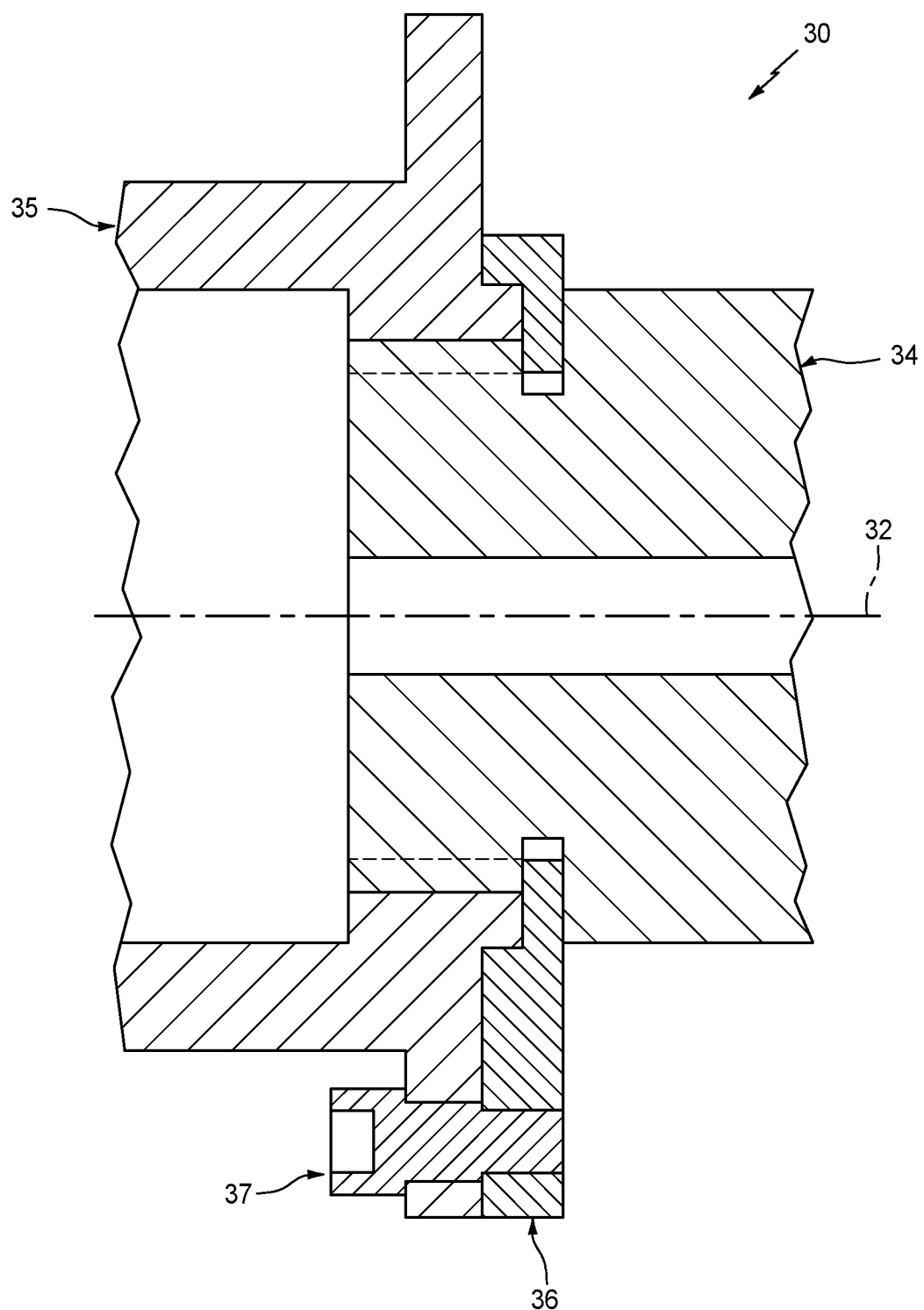
FIG. 1 is a partial sectional illustration of a locking coupling for a rotating assembly.

FIG. 1 illustrates a locking coupling 30 for a rotating assembly with an axis 32. The locking coupling 30 includes a splined shaft 34, a splined hub 35, a splined retainer 36 and one or more fasteners 37A-37C (generally referred to as "37") (e.g., bolts); see also FIG. 23. The rotating assembly axis 32 may be a centerline axis and/or a rotational axis of the locking coupling 30 and/or a centerline axis and/or a rotational axis of one or more or all of the locking coupling components 34-36.

The splined shaft 34 may be configured as a hollow shaft. The splined shaft 34 of FIG. 2, for example, has a tubular shaft sidewall 38 and an internal shaft bore 40. The splined shaft 34 and its sidewall 38 extend axially along the axis 32 to an axial distal end 42 of the shaft 34. The splined shaft 34 and its sidewall 38 extend circumferentially about (e.g., completely around) the axis 32. The splined shaft 34 and its sidewall 38 extend radially out, in a radial outward direction away from the axis 32, to a radial outer, exterior side 44 of the splined shaft 34. More particularly, the shaft sidewall 38 of FIG. 2 extends radially from a radial inner, interior side 46 of the splined shaft 34 to the shaft exterior side 44. A radial outer periphery of the shaft bore 40 is formed by the shaft interior side 46. The shaft bore 40 of FIG. 2 extends axially along the axis 32 at least partially into (or completely through) the splined shaft 34 from the shaft distal end 42. The present disclosure, however, is not limited to such an exemplary hollow shaft. For example, referring to FIG. 3, the splined shaft 34 may alternatively be a solid (non-hollow) shaft configured without an internal shaft bore.

Figure 2:
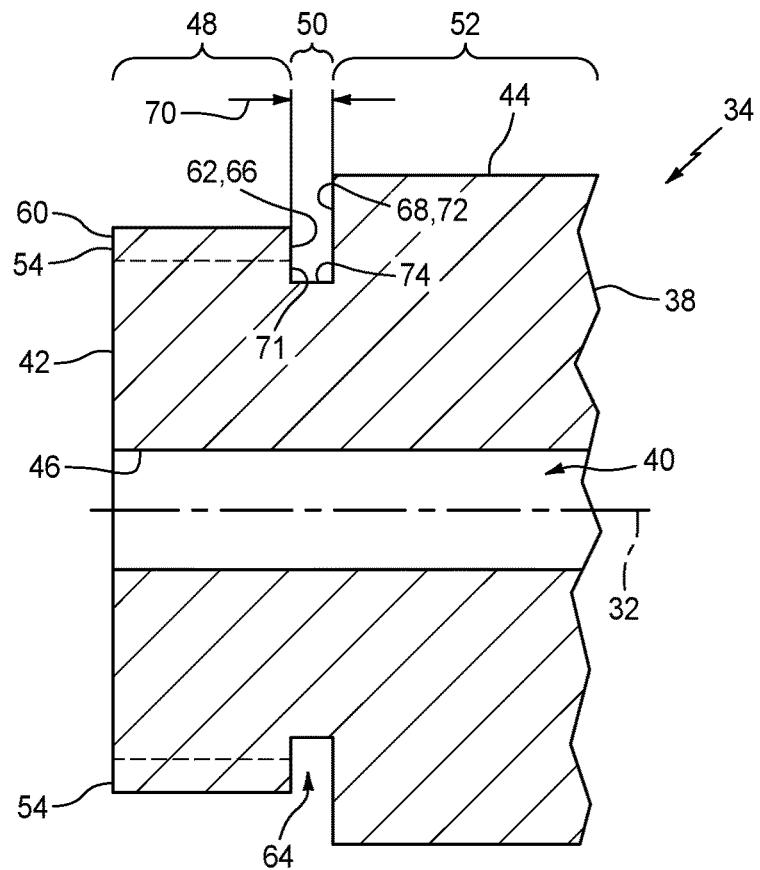
FIG. 2 is a partial sectional illustration of a hollow splined shaft.
Figure 3:
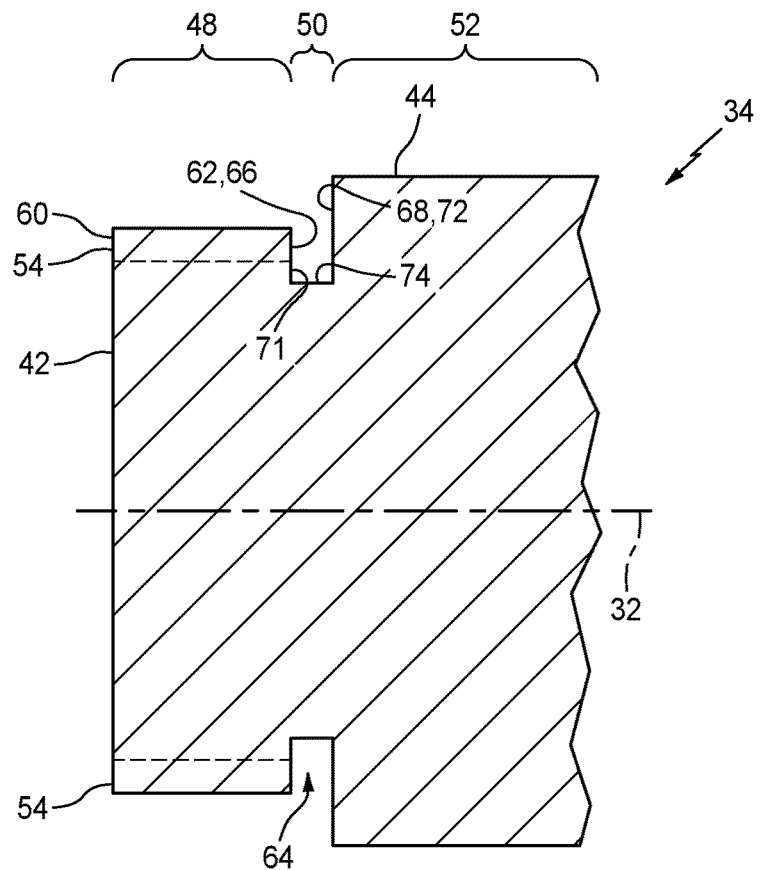
FIG. 3 is a partial sectional illustration of a solid splined shaft.

The splined shaft 34 of FIG. 2 includes a splined portion 48, an undercut portion 50 and a base portion 52. The shaft splined portion 48 is arranged at (e.g., on, adjacent or proximate) the shaft distal end 42. The shaft splined portion 48 of FIG. 2, for example, extends axially along the axis 32 from the shaft distal end 42 to the undercut portion 50.

Figure 4:
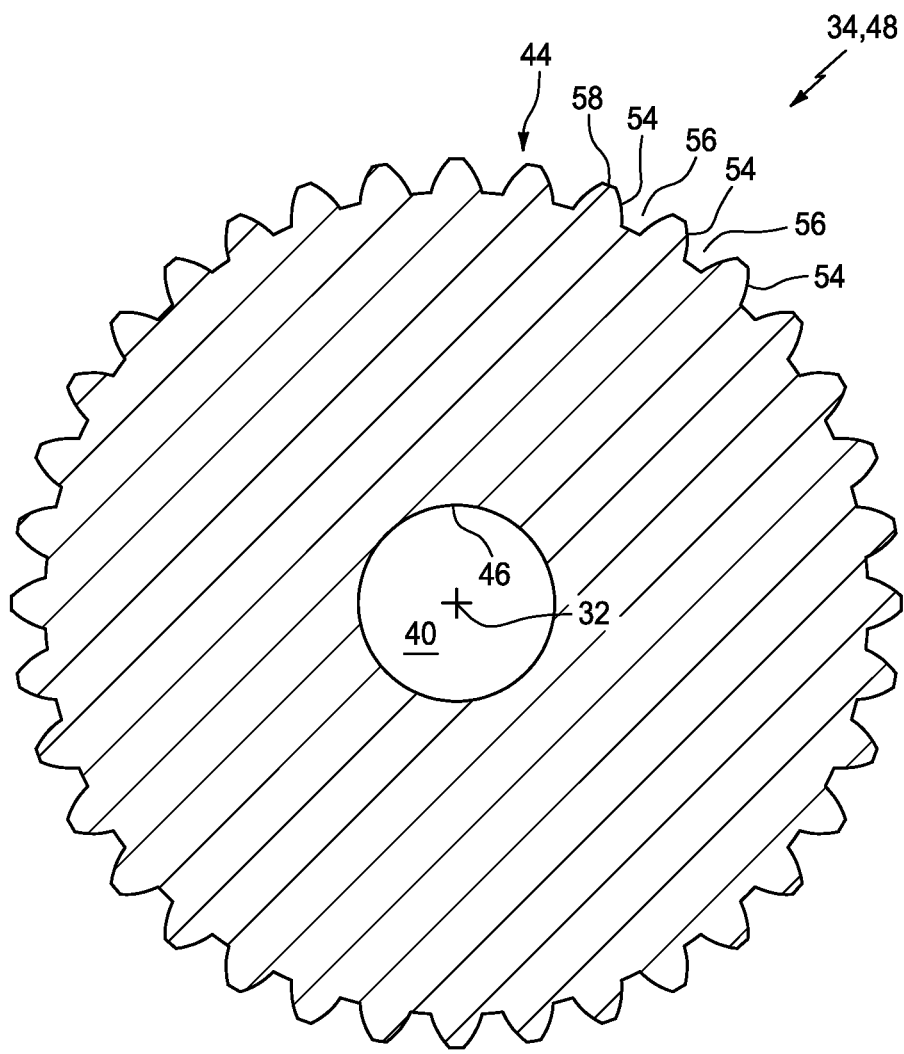
FIG. 4 is a cross-sectional illustration of a splined portion of the splined shaft.

Referring to FIG. 4, the shaft splined portion 48 includes a plurality of external shaft splines 54 (e.g., involute spline teeth, straight spline teeth, etc.) and a plurality of shaft grooves 56 (e.g., spline tooth spaces, slots, keyways, etc.) interspersed with the shaft splines 54. The shaft splines 54 and the shaft grooves 56 are located at the shaft exterior side 44. The shaft splines 54 are arranged circumferentially about the axis 32 in an annular array. Each of the shaft splines 54 is circumferentially spaced from respective circumferentially adjacent (e.g., directly neighboring) shaft splines 54. Each shaft groove 56 is thereby formed by and extends circumferentially between a respective circumferentially adjacent pair of the shaft splines 54.

Each of the shaft splines 54 projects radially outward from a (e.g., tubular) base of the shaft splined portion 48 to a distal end 58 (e.g., a tip and/or a ridge) of the respective shaft spline 54. Referring to FIG. 2, each of the shaft splines 54 extends axially along the axis 32 between and to an axial first end 60 of the respective shaft spline 54 and an axial second end 62 of the respective shaft spline 54. The shaft spline first end 60 is located at the shaft distal end 42. The shaft spline second end 62 is located adjacent/next to the shaft undercut portion 50.

The shaft undercut portion 50 is arranged axially between and connected to the shaft splined portion 48 and the shaft base portion 52. The shaft undercut portion 50 of FIG. 2, for example, extends axially along the axis 32 between and to the shaft splined portion 48 and the shaft base portion 52.

Figures 5, 6:
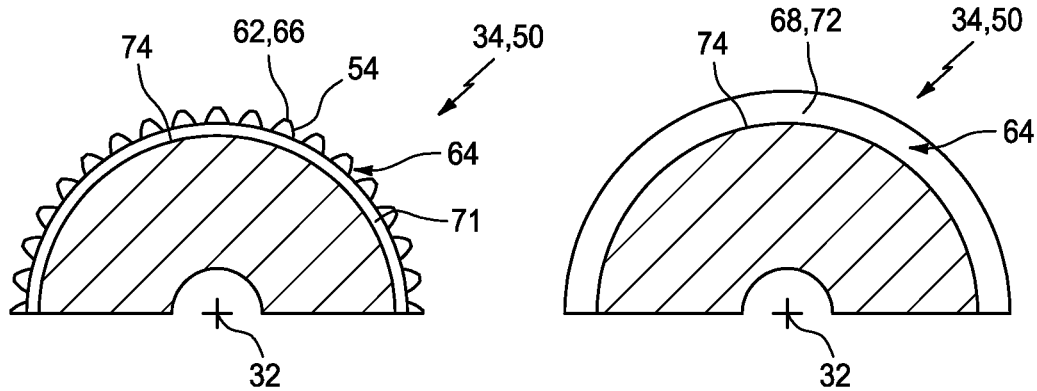
FIG. 5 is a partial cross-sectional illustration of an undercut portion of the splined shaft looking axially towards the splined portion.
FIG. 6 is a partial cross-sectional illustration of the undercut portion looking axially towards an annular shoulder on the splined shaft.

The shaft undercut portion 50 includes an undercut 64; e.g., an annular groove or channel. This undercut 64 is provided such that, for example, a machining tool can run and form (e.g., cut) a complete length of a shaft groove 56 between respective adjacent shaft splines 54. The undercut 64 extends axially along the axis 32 within the splined shaft 34 between and to an axial first end 66 of the undercut 64 and an axial second end 68 of the undercut 64, thereby providing the undercut 64 with an axial length 70. Referring to FIG. 5, the undercut first end 66 may be formed collectively by the second ends 62 of the shaft splines 54 and a (e.g., annular) shoulder 71 of the splined shaft 34 at an interface between the shaft undercut portion 50 and the shaft splined portion 48. Referring to FIG. 6, the undercut second end 68 may be formed by a (e.g., annular) shoulder 72 of the splined shaft 34 at an interface between the shaft undercut portion 50 and the shaft base portion 52. Referring again to FIG. 2, the undercut 64 extends radially into the splined shaft 34 from the shaft exterior side 44 to a radial side 74 of the undercut 64, which undercut side 74 extends axially between and to (A) the second ends 62 of the shaft splines 54 and the shaft shoulder 71 and (B) the shaft shoulder 72. The undercut 64 extends circumferentially about (e.g., completely around) the axis 32 within the splined shaft 34; see also FIGS. 5 and 6.

Figure 7:
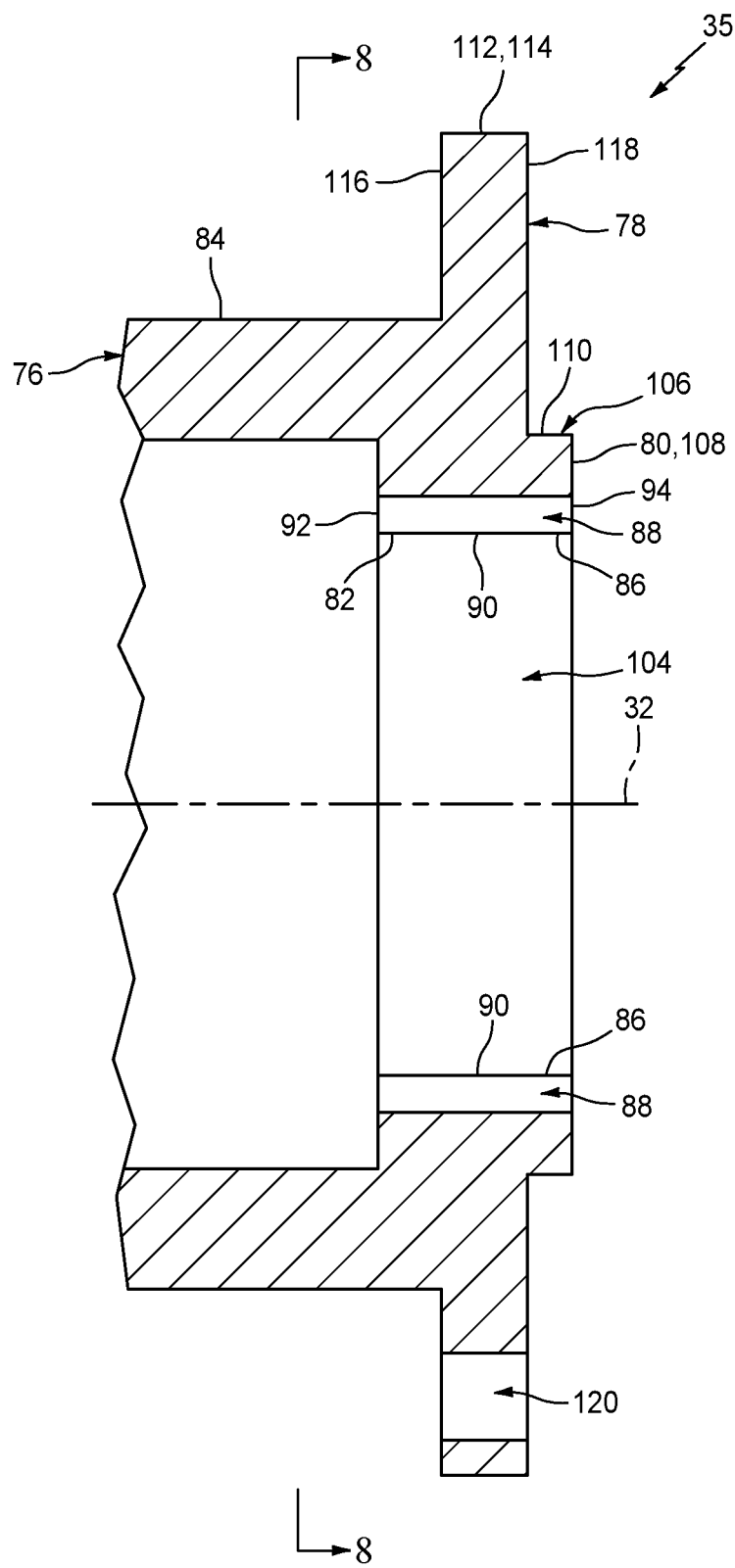
FIG. 7 is a partial sectional illustration of a splined hub.

Referring to FIG. 7, the splined hub 35 includes a (e.g., tubular) hub base 76 and a (e.g., annular) hub mount 78; e.g., a radial flange or a radial rim. The hub base 76 extends axially along the axis 32 to an axial distal end 80 of the splined hub 35. The hub base 76 extends radially between and to a radial inner, interior side 82 (e.g., a tooth tip diameter) of the splined hub 35 and a radial outer, exterior side 84 of the hub base 76. The hub base 76 extends circumferentially about (e.g., completely around) the axis 32.

Figure 8:
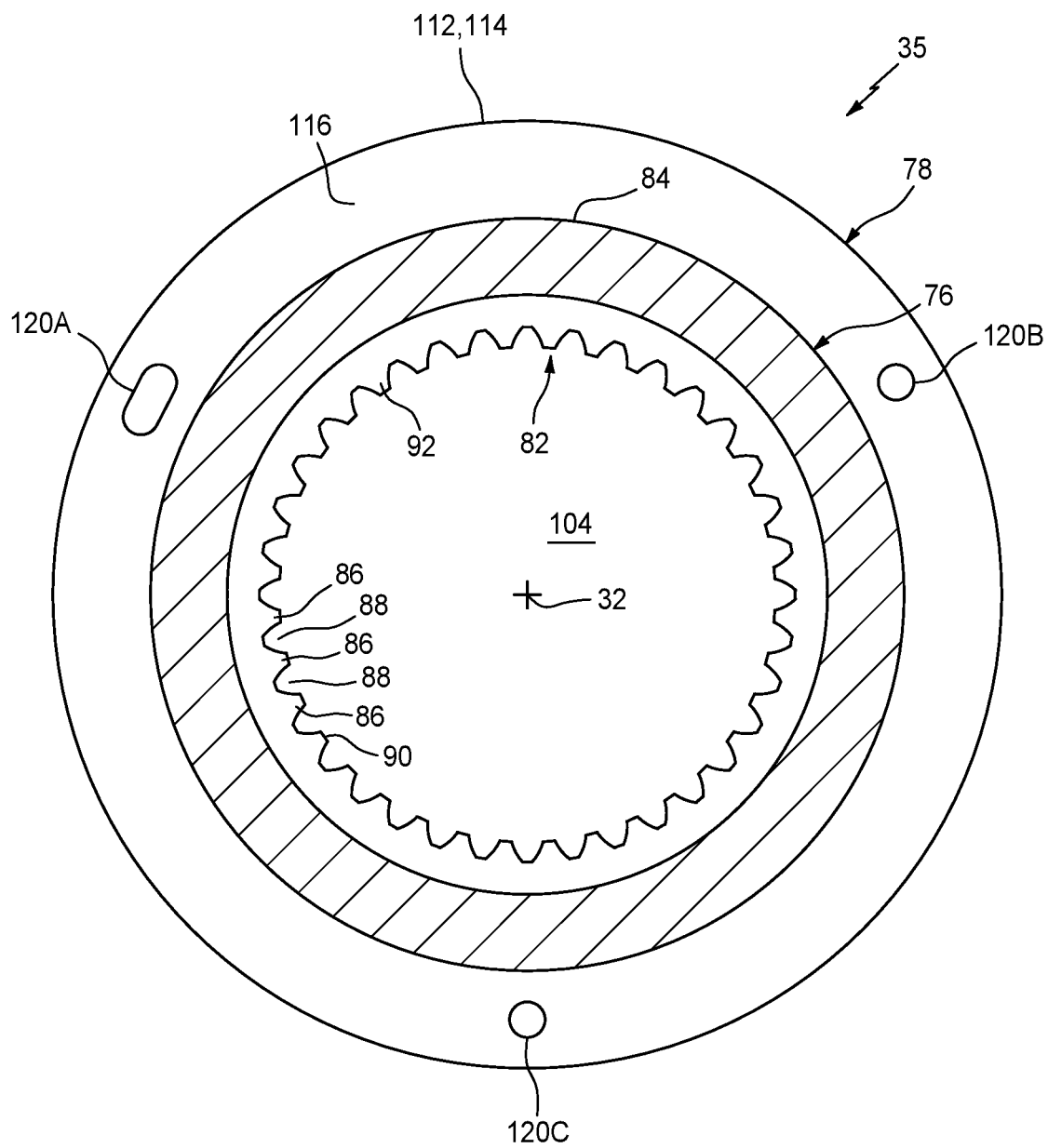
FIG. 8 is a cross-sectional illustration of the splined hub taken along line 8-8 in FIG. 7.

Referring to FIG. 8, the hub base 76 includes a plurality of internal hub splines 86 (e.g., involute spline teeth, straight spline teeth, etc.) and a plurality of hub grooves 88 (e.g., spline tooth spaces, slots, keyways, etc.) interspersed with the hub splines 86. The hub splines 86 and the hub grooves 88 are located at the hub interior side 82. The hub splines 86 are arranged circumferentially about the axis 32 in an annular array. Each of the hub splines 86 is circumferentially spaced from respective circumferentially adjacent (e.g., directly neighboring) hub splines 86. Each hub groove 88 is thereby formed by and extends circumferentially between a respective circumferentially adjacent pair of the hub splines 86.

Each of the hub splines 86 projects radially inward from a (e.g., tubular) wall of the hub base 76 to a distal end 90 (e.g., a tip and/or a ridge) of the respective hub spline 86. Referring to FIG. 7, each of the hub splines 86 extends axially along the axis 32 between and to an axial first end 92 of the respective hub spline 86 and an axial second end 94 of the respective hub spline 86. The hub spline second end 94 is located at the hub distal end 80.

Referring to FIG. 9, each circumferentially adjacent pair of the hub splines 86 defines a hub spline circular tooth thickness 96 and a hub spline pitch angle 98. The term circular tooth thickness may describe an arch length measured between opposing (e.g., right and left) sides (e.g., 100) of a respective spline (e.g., 86) at, for example, a pitch diameter (e.g., at or about a radial center 101) of the respective spline (e.g., 86). The term pitch angle may describe an angle measured about an axis (e.g., 32) between a circumferential center (e.g., 102) or centerline of a first splines (e.g., 86) and a circumferential center (e.g., 102) or centerline of a second spline (e.g., 86) that is circumferentially adjacent the first spline.

Referring to FIG. 7. the hub base 76 also includes an internal hub bore 104 and a (e.g., annular) protrusion 106; e.g., an axial flange or an axial rim. A radial outer periphery of the hub bore 104 is formed by the hub interior side 82. More particularly, the hub bore 104 is at least partially (or completely) radially bounded by the hub splines 86. The hub splines 86 are thereby arranged circumferentially around the hub bore 104. The hub bore 104 of FIG. 7 extends axially along the axis 32 at least partially into (or completely through) the splined hub 35 from the hub distal end 80.

The hub protrusion 106 is located at the hub distal end 80. The hub protrusion 106 of FIG. 7, for example, projects axially along the axis 32 to an axial distal end 108 of the hub protrusion 106 at the hub distal end 80. The hub protrusion 106 extends radially from the hub interior side 82 to a radial outer, exterior side 110 of the hub protrusion 106. The hub protrusion 106 extends circumferentially about (e.g., completely around) the axis 32. The hub protrusion 106 of FIG. 7 may also carry/form axial end portions of the hub splines 86 at the hub distal end 80.

The hub mount 78 is connected to the hub base 76 at the hub base exterior side 84. The hub mount 78 of FIG. 7, for example, projects radially out from the hub base 76 and its exterior side 84 to a radial distal end 112 of the hub mount 78 located at a radial outer, exterior side 114 of the splined hub 35. The hub mount 78 extends axially along the axis 32 between and to an axial first side 116 of the hub mount 78 and an axial second side 118 of the hub mount 78. The mount second side 118 is located at the hub distal end 80. The mount second side 118 of FIG. 7, for example, is slightly axially recessed from the hub distal end 80 and the protrusion distal end 108.

Referring to FIG. 8, an outer periphery of the splined hub 35 and its hub mount 78 at the hub exterior side 114 may be configured with a circular cross-sectional geometry when viewed, for example, in a plane perpendicular to the axis 32. The present disclosure, however, is not limited to such an exemplary circular splined hub mount. For example, in other embodiments, the outer periphery of the splined hub 35 and/or its hub mount 78 may be configured with a non-circular cross-sectional geometry such as, but not limited to, a polygonal cross-sectional geometry.

Referring to FIG. 8, the hub mount 78 includes one or more fastener apertures 120A-C (generally referred to as "120"). These hub fastener apertures 120 are arranged circumferentially about the axis 32 in an annular array. Referring to FIG. 7, each of the hub fastener apertures 120 extends axially through the hub mount 78 between the mount first side 116 and the mount second side 118.

Referring to FIG. 8, the hub fastener aperture 120A is configured as an elongated aperture; e.g., an untapped through-slot. The hub fastener aperture 120A of FIG. 8, for example, has an elongated cross-sectional geometry when viewed, for example, in a plane perpendicular to the axis 32. This elongated cross-sectional geometry may have a racetrack shape or an oval shape. The present disclosure, however, is not limited to such exemplary elongated shapes.

Referring to FIG. 10, the hub fastener aperture 120A extends longitudinally along a major axis 122 (e.g., circumferentially about the axis 32) between and to a circumferential first side 124 of the hub fastener aperture 120A and a circumferential second side 126 of the hub fastener aperture 120A. The hub fastener aperture 120A has an aperture pitch angle 128. The term aperture pitch angle may describe an angle measured about an axis (e.g., 32) between centers (e.g., 130) of imaginary circles (e.g., 132) at respect ends (e.g., 124 and 126) of a slot aperture (e.g., 120A). The aperture pitch angle 128 may be equal to the hub spline pitch angle 98 (see FIG. 9) and/or a retainer spline pitch angle 134 (see FIG. 13). Alternatively, the aperture pitch angle 128 may be different (e.g., slightly greater) than the hub spline pitch angle 98 (see FIG. 9) and/or the retainer spline pitch angle 134 (see FIG. 13).

Referring to FIG. 8, each hub fastener aperture 120B, 120C is configured as a circular aperture; e.g., an untapped circular through-hole. Each hub fastener aperture 120B, 120C of FIG. 8, for example, has a circular cross-sectional geometry when viewed, for example, in a plane perpendicular to the axis 32.

Figure 11:
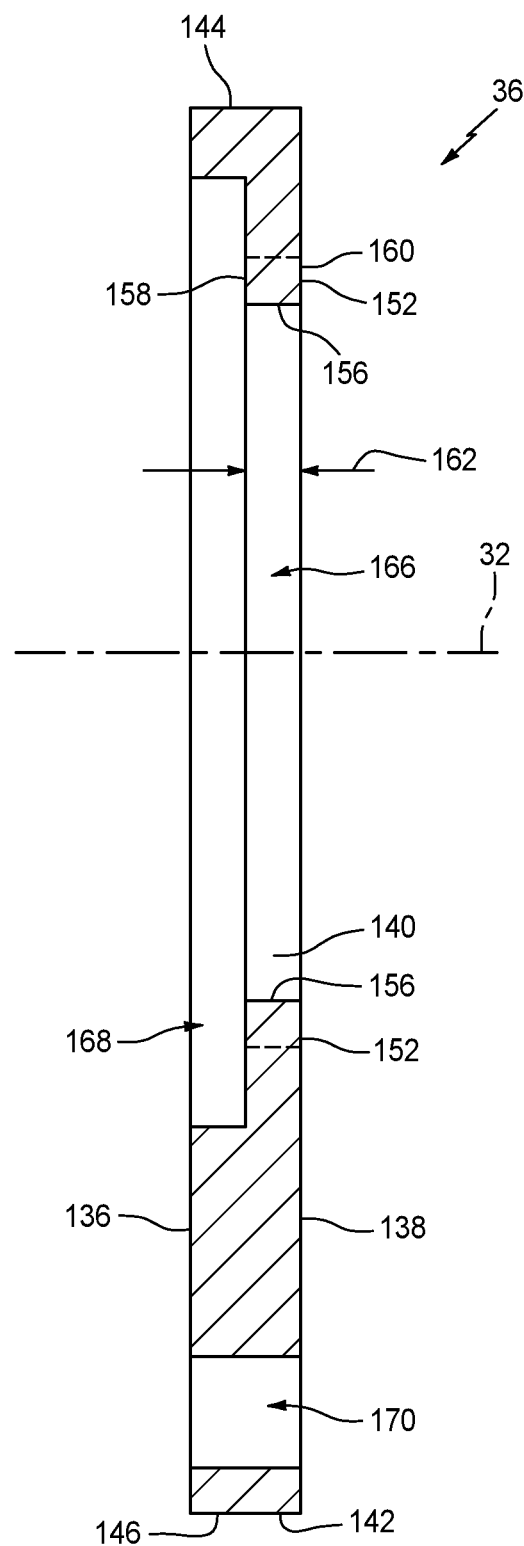
FIG. 11 is a sectional illustration of an internally splined retainer.

Referring to FIG. 11, the splined retainer 36 extends axially along the axis 32 between and to an axial first side 136 of the splined retainer 36 and an axial second side 138 of the splined retainer 36. The splined retainer 36 extends radially between and to a radial inner, interior side 140 (e.g., a tooth tip diameter) of the splined retainer 36 and a radial outer, exterior side 142 of the splined retainer 36. The splined retainer 36 extends circumferentially about (e.g., completely around) the axis 32.

Figure 12:
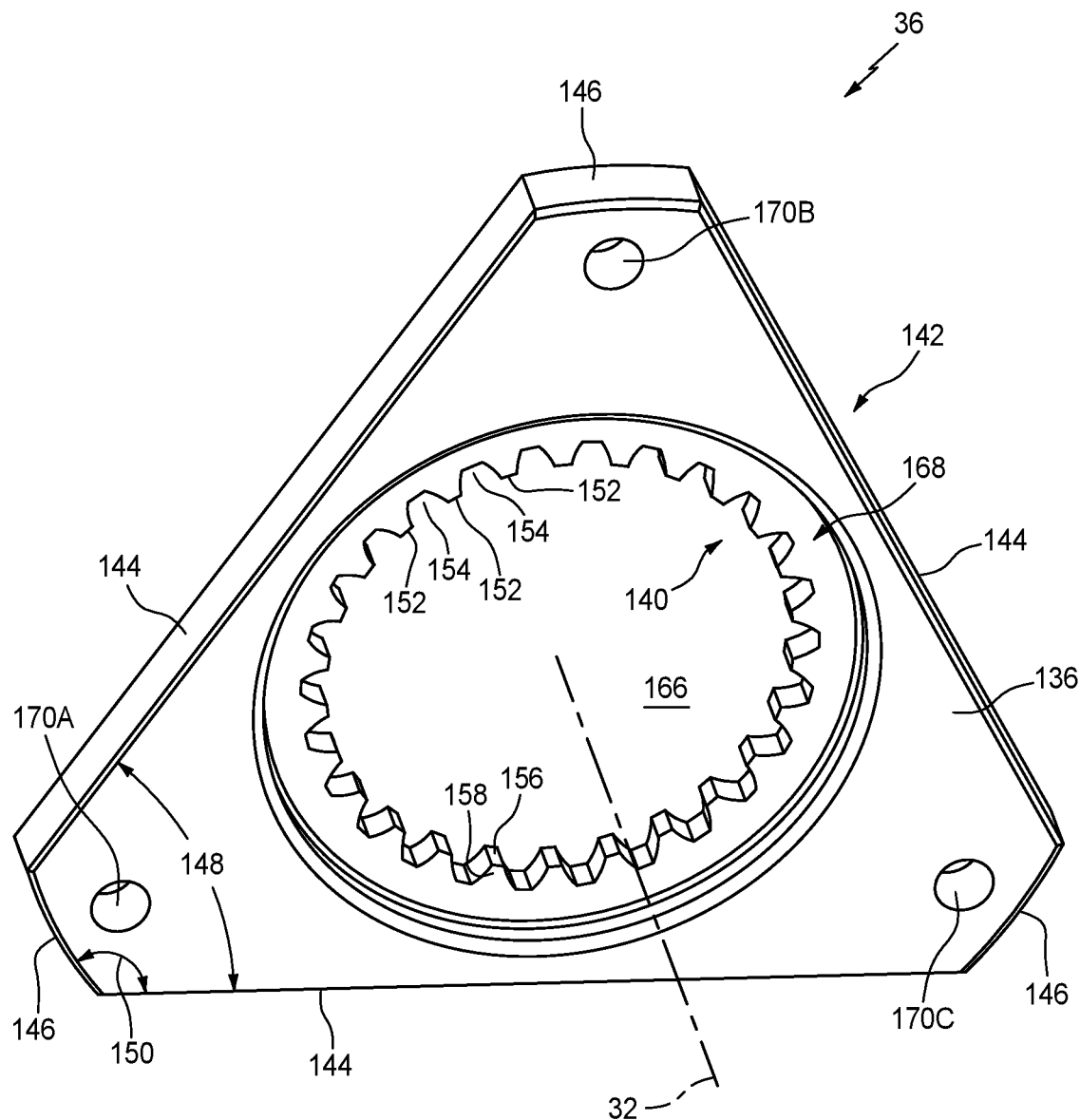
FIG. 12 is a perspective illustration of the splined retainer.

Referring to FIG. 12, an outer periphery of the splined retainer 36 at the retainer exterior side 142 may be configured with a non-circular cross-sectional geometry when viewed, for example, in a plane perpendicular to the axis 32. This non-circular cross-sectional geometry may be generally triangular; e.g., triangular with blunt tips. The non-circular cross-sectional geometry of FIG. 12, for example, includes three (3) major side segments 144 and three (3) minor side segments 146 interspersed with the major side segments 144. Each adjacent pair of the major side segments 144 may be angularly offset by an included angle 148; e.g., an acute angle such as sixty degrees (60°). Each of the major side segments 144 may follow a straight (or alternatively slightly curved) trajectory between a respective adjacent pair of the minor side segments 146. Each of the minor side segments 146 is angularly offset from each adjacent major side segment 144 by an included angle 150; e.g., an obtuse angle such as one-hundred and twenty degrees (120°) where, for example, the splined retainer 36 includes three (3) fastener apertures 170. Each of the minor side segments 146 may follow a curved (or alternatively straight) trajectory between a respective adjacent pair of the major side segments 144. Each minor side segment 146 of FIG. 12, for example, has a constant radius about the axis 32. The present disclosure, however, is not limited to the foregoing exemplary non-circular cross-sectional geometry nor to non-circular cross-sectional geometries. For example, in other embodiments, the retainer outer periphery may be configured with another (e.g., generally) polygonal (e.g., diamond, square, etc.) cross-sectional geometry or a circular cross-sectional geometry.

The splined retainer 36 includes a plurality of internal retainer splines 152 (e.g., involute spline teeth, straight spline teeth, etc.) and a plurality of retainer grooves 154 (e.g., spline tooth spaces, slots, keyways, etc.) interspersed with the retainer splines 152. The retainer splines 152 are configured with a complimentary form to the shaft splines 54 and/or the hub splines 86. In addition, a number of the retainer splines 152 is equal to a number of the shaft splines 54 and a number of the hub splines 86.

The retainer splines 152 and the retainer grooves 154 are located at the retainer interior side 140. The retainer splines 152 are arranged circumferentially about the axis 32 in an annular array. Each of the retainer splines 152 is circumferentially spaced from respective circumferentially adjacent (e.g., directly neighboring) retainer splines 152. Each retainer groove 154 is thereby formed by and extends circumferentially between a respective circumferentially adjacent pair of the retainer splines 152.

Each of the retainer splines 152 projects radially inward from a (e.g., annular) base of the splined retainer 36 to a distal end 156 (e.g., a tip and/or a ridge) of the respective retainer spline 152. Referring to FIG. 11, each of the retainer splines 152 extends axially along the axis 32 between and to an axial first end 158 of the respective retainer spline 152 and an axial second end 160 of the respective retainer spline 152, thereby providing each retainer spline 152 with an axial length 162 (e.g., a face width). The retainer spline first end 158 is located proximate (or on) the retainer first side 136. The retainer spline second end 160 is located at the retainer second side 138.

The retainer spline axial length 162 may be substantially equal (e.g., slightly less than to provide a clearance fit) to the undercut axial length 70 (see FIG. 2) to provide a relatively tight fit for the retainer 36 in its assembly and locked position (see FIG. 1). Alternatively, the retainer spline axial length 162 may be different (e.g., less) than the undercut axial length 70 (see FIG. 2) to provide a looser/axially floating fit for the retainer 36 in its assembly and locked position. For example, purposeful under-sizing of the retainer spline axial length 162 (e.g., sizing the length 162 less than the length 70) may be used as a design feature for axial float of the splined retainer 36 within the undercut 64 and, thus, the splined hub 35 along the splines shaft 34.

Figure 13:
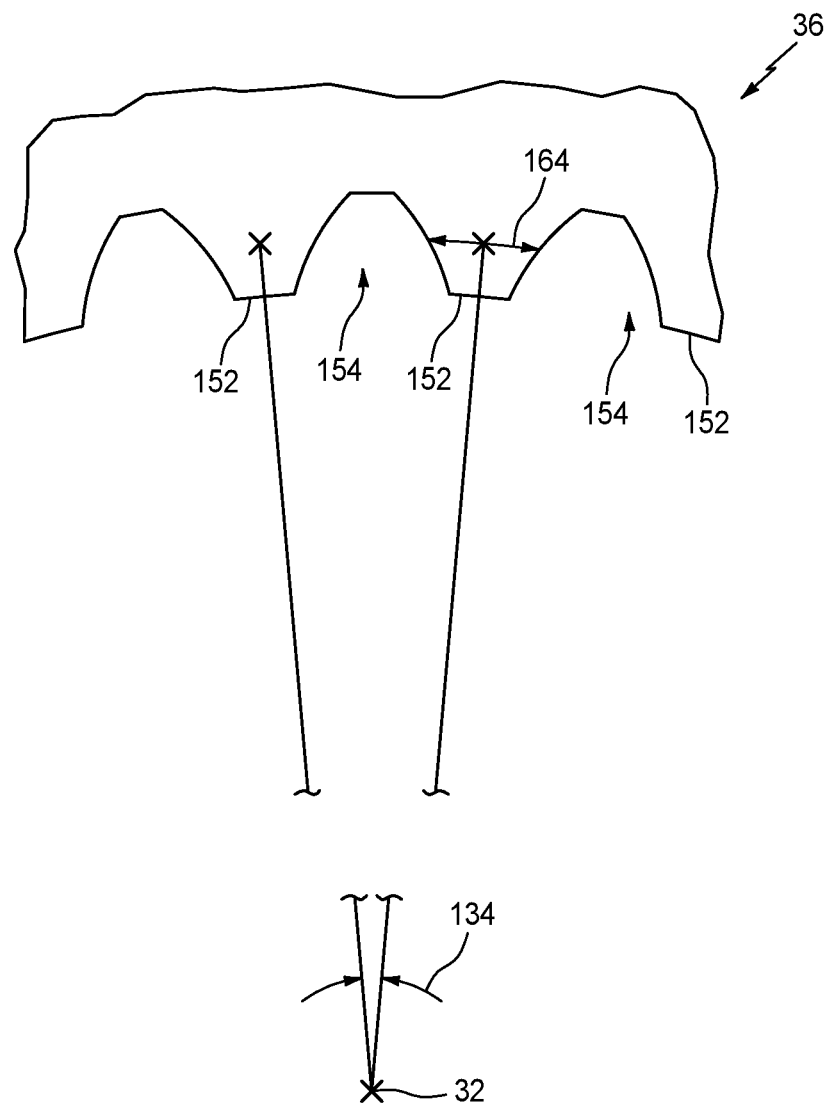
FIG. 13 is a partial illustration of internal splines included in the splined retainer.

Referring to FIG. 13, each circumferentially adjacent pair of the retainer splines 152 defines a retainer spline circular tooth thickness 164 and the retainer spline pitch angle 134. The retainer spline circular tooth thickness 164 may be equal to the hub spline circular tooth thickness 96 (see FIG. 9). The retainer spline pitch angle 134 may be equal to the hub spline pitch angle 98 (see FIG. 9). With such an arrangement, a tool or tools that form the hub splines 86 in the splined hub 35 may also be used to form the retainer splines 152 in the splined retainer 36. Of course, in other embodiments, retainer spline circular tooth thickness 164 may be different (e.g., less) than the hub spline circular tooth thickness 96 (see FIG. 9) such that a fitting between the splined retainer 36 and the splined shaft 34 is slightly looser than a fitting between the splined hub 35 and the splined shaft 34 (see FIG. 1), which fittings are described below in further detail.

Referring to FIG. 11, the splined retainer 36 includes an internal retainer bore 166 and an internal hub counterbore 168. A radial outer periphery of the retainer bore 166 is formed by the retainer interior side 140. More particularly, the retainer bore 166 is at least partially (or completely) radially bounded by the retainer splines 152 at their tips. The retainer splines 152 are thereby arranged circumferentially around the retainer bore 166. The retainer bore 166 of FIG. 11 extends axially along the axis 32 at least partially into (or completely through) the splined retainer 36 from the retainer second side 138 to the retainer counterbore 168. The retainer counterbore 168 extends axially along the axis 32 partially into the splined retainer 36 from the retainer first side 136 to the retainer bore 166 and the first ends 158 of the retainer splines 152. This retainer counterbore 168 is configured (e.g., shaped and sized) to receive the hub protrusion 106 as described below.

Referring to FIG. 12, the splined retainer 36 also includes one or more fastener apertures 170A-C (generally referred to as "170"). These retainer fastener apertures 170 are arranged circumferentially about the axis 32 in an annular array. Each retainer fastener aperture 170 is configured as a circular aperture; e.g., a tapped circular through-hole. Each retainer fastener aperture 170 of FIG. 12, for example, has a circular cross-sectional geometry when viewed, for example, in a plane perpendicular to the axis 32. Referring to FIG. 11, each of the retainer fastener apertures 170 extends axially through the splined retainer 36 between the retainer first side 136 and the retainer second side 138.

Figure 14:
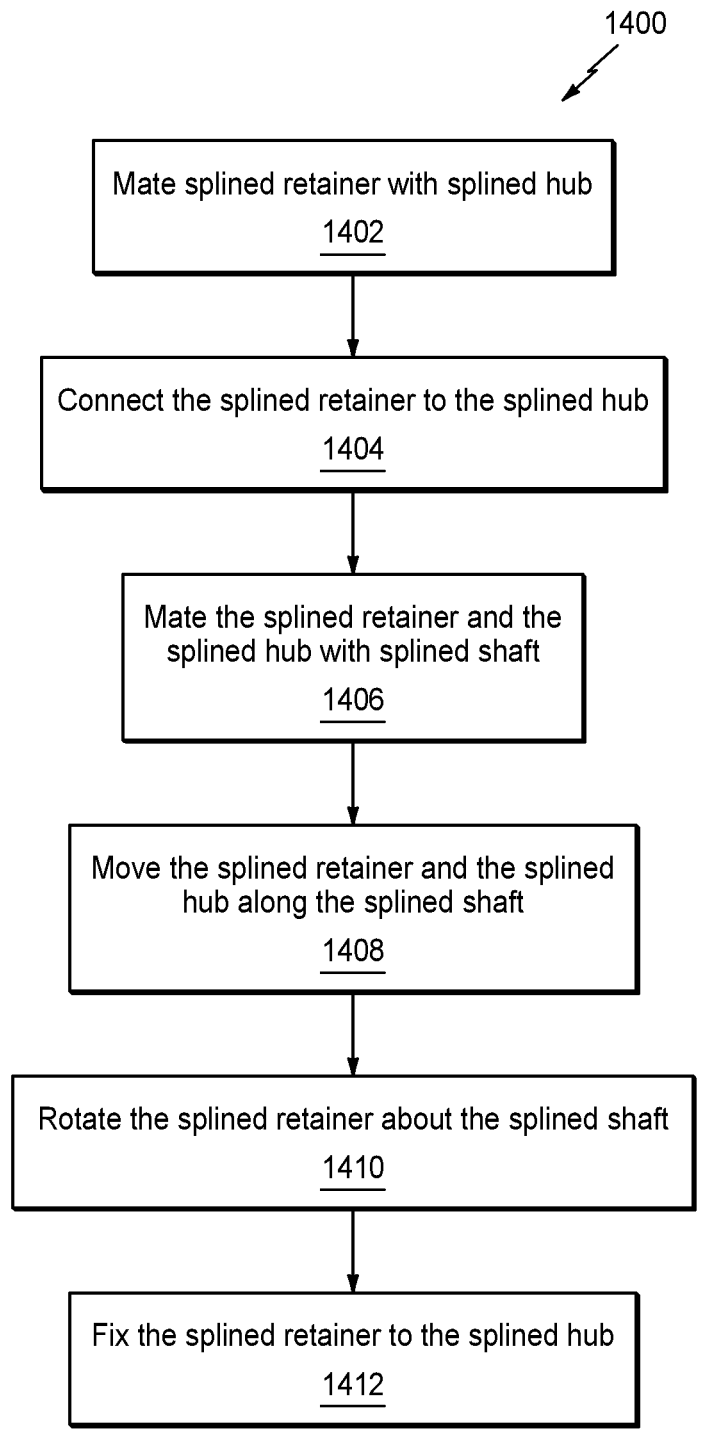
FIG. 14 is a flow diagram of a manufacturing method.

FIG. 14 is a flow diagram of a manufacturing method 1400. During this method 1400, a locking coupling such as the locking coupling 30 described above may be assembled.

Figure 16:
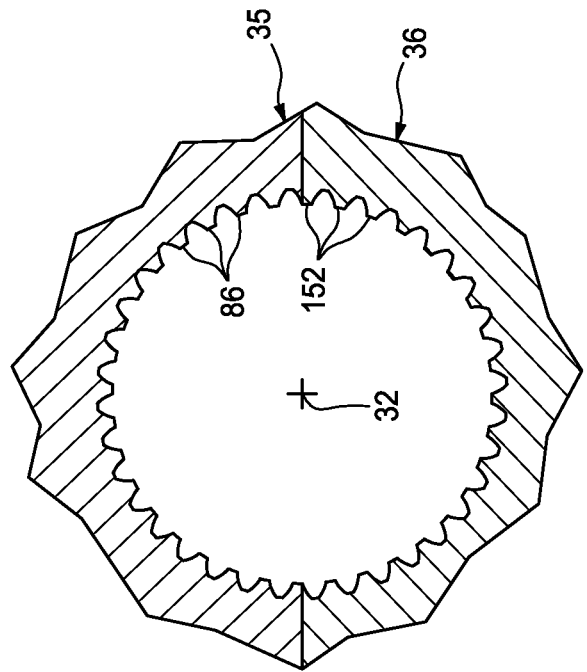
FIG. 16 is a partial cross-sectional illustration of the assembly of FIG. 15 taken along line 16-16 in FIG. 15.
Figure 15:
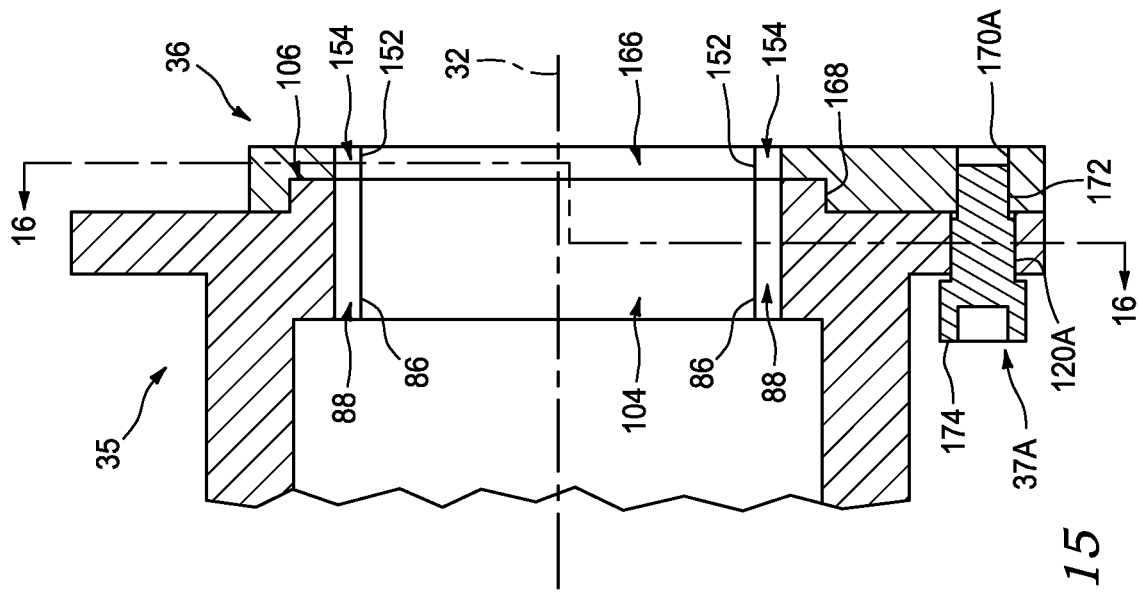
FIG. 15 is a partial sectional illustration of the splined hub mated with the splined retainer.

In step 1402, the splined retainer 36 is mated with the splined hub 35. For example, referring to FIG. 15, the splined retainer 36 may be positioned axially adjacent the splined hub 35. The hub protrusion 106 may be mated with (e.g., inserted axially into) the retainer counterbore 168. The hub protrusion 106 and the retainer counterbore 168 may be closely sized such that the mating of these elements 106 and 168 coaxially aligns the splined retainer 36 with the splined hub 35. However, a diameter of the hub protrusion 106 may be slightly smaller than a diameter of the retainer counterbore 168 such that the splined retainer 36 may relatively freely (e.g., without binding) move (e.g., rotate) relative to the splined hub 35 as described below. Each of the hub splines 86 may be located axially next to (e.g., abutted axially against) a respective one of the retainer splines 152. Referring to FIGS. 15 and 16, the hub splines 86 may be circumferentially aligned with the retainer splines 152. Each of the hub splines 86 may thereby circumferentially and radially overlap a respective one of the retainer splines 152. The hub grooves 88 may also be circumferentially aligned with the retainer grooves 154.

In step 1404, the splined retainer 36 is loosely connected to the splined hub 35. For example, referring to FIG. 15, the fastener 37A is mated with (e.g., received within) the hub fastener aperture 120A and the respective retainer fastener aperture 170A. More particularly, a threaded shaft 172 of the fastener 37A is passed through the hub fastener aperture 120A and threaded (e.g., screwed) partially into the respective retainer fastener aperture 170A. A head 174 of the fastener 37A may press lightly against or may be spaced slightly axially from the splined hub 35. For example, the fastener 37A may be threaded into the respective retainer fastener aperture 170A enough such that, for example, (a) the hub protrusion 106 cannot slide axially out of the retainer counterbore 168, but (b) the fastener 37A can move within the hub fastener aperture 120A (e.g., the slot) to permit limited relative rotation about the axis 32 between the locking coupling components 35 and 36 as described below, for example, in step 1410.

Figure 18:
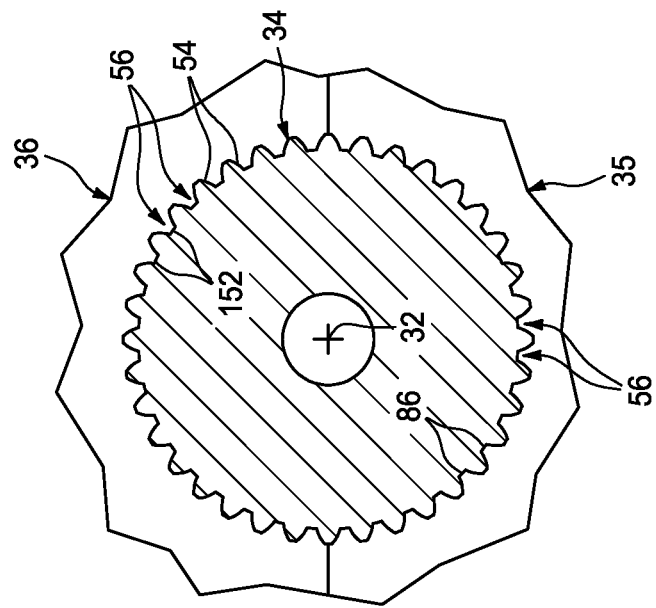
FIG. 18 is a partial cross-sectional illustration of the assembly of FIG. 17 taken along line 18-18 in FIG. 17.
Figure 17:
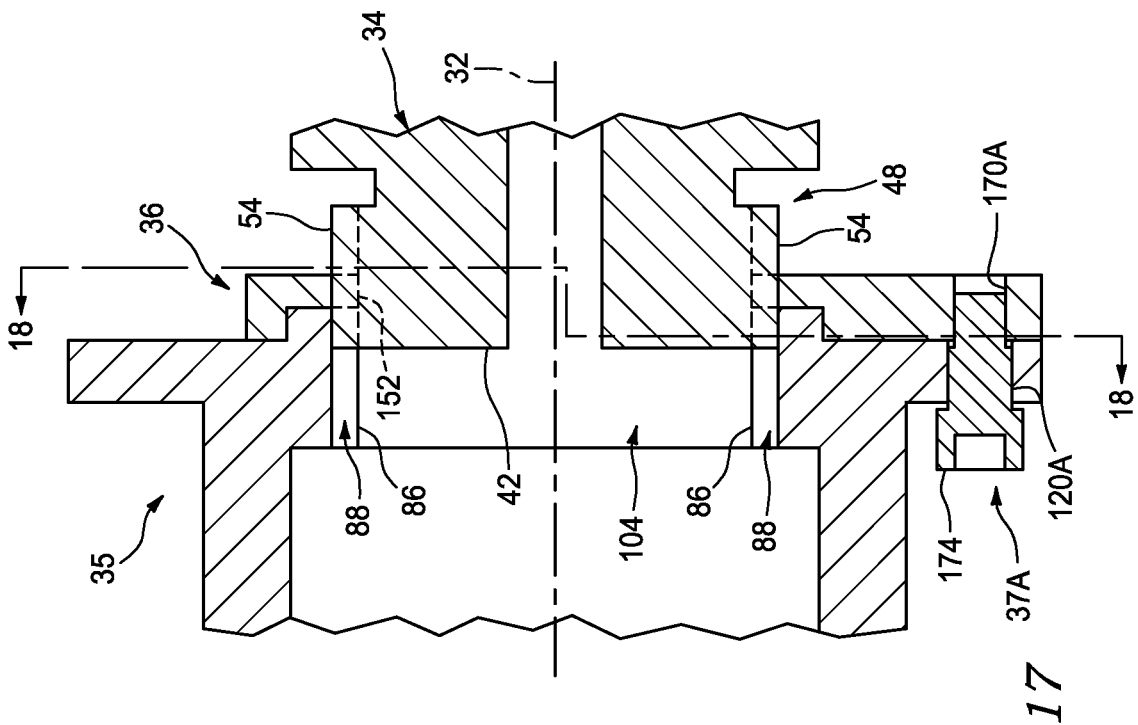
FIG. 17 is a partial sectional illustration of the splined hub and the splined retainer partially mounted on the splined shaft.

In step 1406, the splined hub 35 and the splined retainer 36 are mated with the splined shaft 34. For example, referring to FIG. 17, the shaft splined portion 48 is inserted sequentially into the retainer bore 166 (see FIG. 15) and the hub bore 104. At the partially mounted position of FIG. 17, the retainer splines 152 and the hub splines 86 are mated (e.g., meshed) with the shaft splines 54. In particular, referring to FIG. 18, each spline 86, 152 is disposed within a respective shaft groove 56 and arranged circumferentially between a respective circumferentially adjacent pair of the shaft splines 54.

Figure 19:
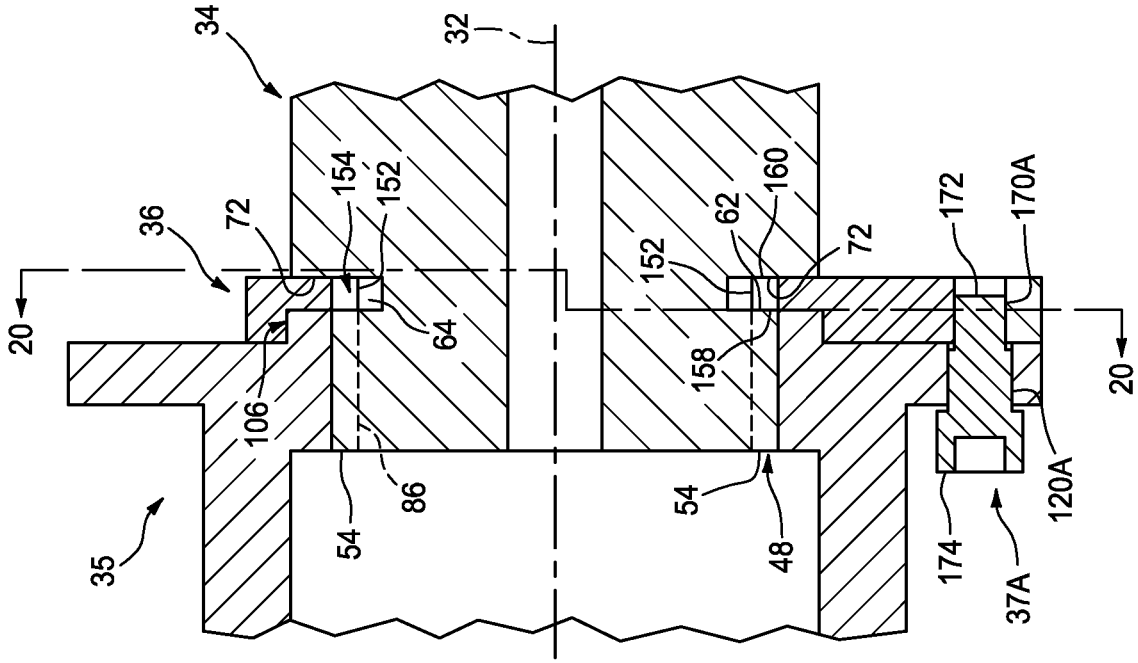
FIG. 19 is a partial sectional illustration of the splined hub and the splined retainer mounted on the splined shaft with the splined retainer in an unlocked position.

In step 1408, the splined hub 35 and the splined retainer 36 are moved along the splined shaft 34. For example, the splined hub 35 and the splined retainer 36 may be slid along the shaft splined portion 48 from the partially mounted position of FIG. 17 to the mounted, unlocked position of FIG. 19. At the mounted, unlocked position of FIG. 19, the hub splines 86 are (e.g., fully) mated with the shaft splines 54 and the splined retainer 36 and its retainer splines 152 are mated with (e.g., seated axially within) the undercut 64. The first ends 158 of retainer splines 152, for example, are axially adjacent the second ends 62 of the shaft splines 54. The second ends 160 of the retainer splines 152 are axially adjacent and, for example, abutted axially against the shaft shoulder 72. However, each of the retainer splines 152 may still be circumferentially aligned with a respective one of the shaft grooves 56.

Figure 20:
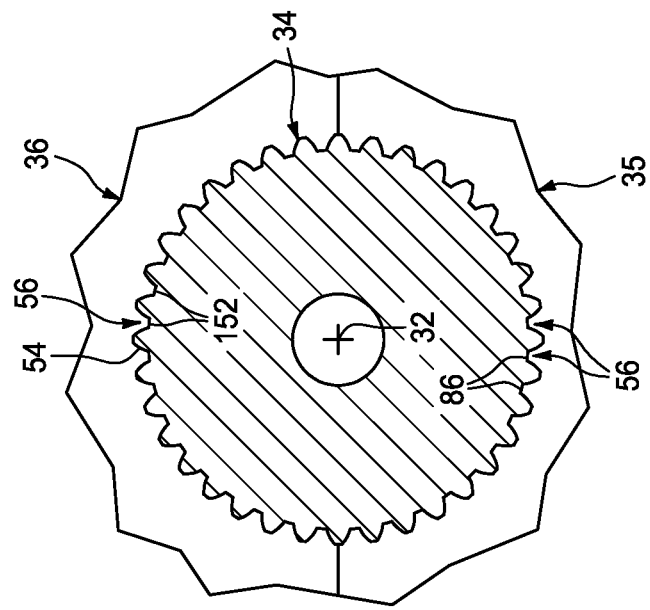
FIG. 20 is a partial cross-sectional illustration of the assembly of FIG. 19 taken along line 20-20 in FIG. 19.
Figure 22:
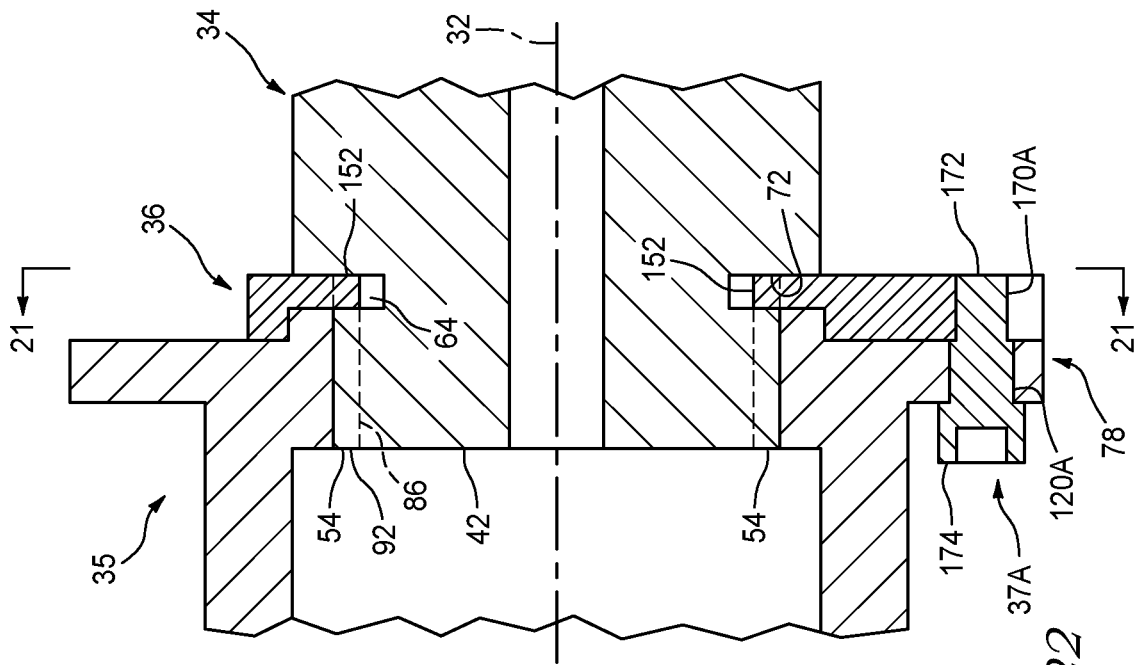
FIG. 22 is a partial sectional illustration of the splined hub and the splined retainer mounted on the splined shaft with the splined retainer in a locked position.
Figure 21:
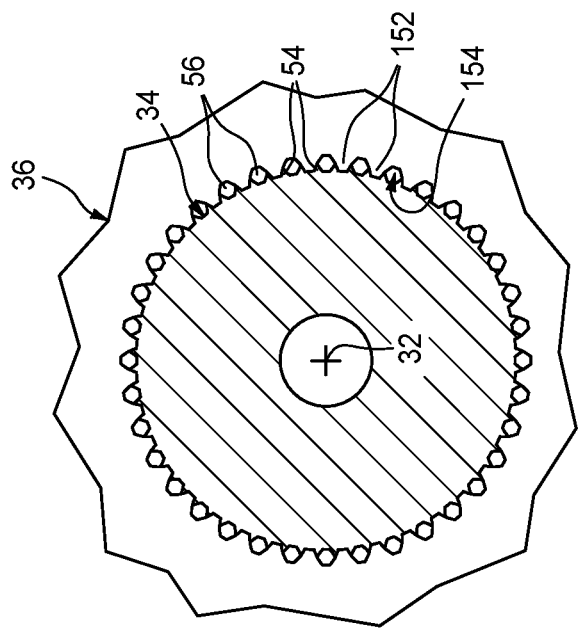
FIG. 21 is a partial cross-sectional illustration of the assembly of FIG. 22 taken along line 21-21 in FIG. 22.

In step 1410, the splined retainer 36 is rotated about the splined shaft 34. For example, the splined retainer 36 may be rotated about the splined shaft 34/the axis 32 from the mounted, unlocked position of FIG. 20 (see also FIG. 19) to the mounted, locked position of FIG. 21 (see also FIG. 22). Referring to FIG. 22, in the mounted, locked position, the retainer splines 152 are respectively circumferentially aligned with the shaft splines 54. More particularly, each of the retainer splines 152 circumferentially and radially overlaps a respective one of the shaft splines 54. Each of the retainer splines 152 is further arranged and, thus, captured/retained axially between a respective one of the shaft splines 54 and the shaft shoulder 72. The splined retainer 36 may thereby be axially restrained/secured to the splined shaft 34.

Figure 23:
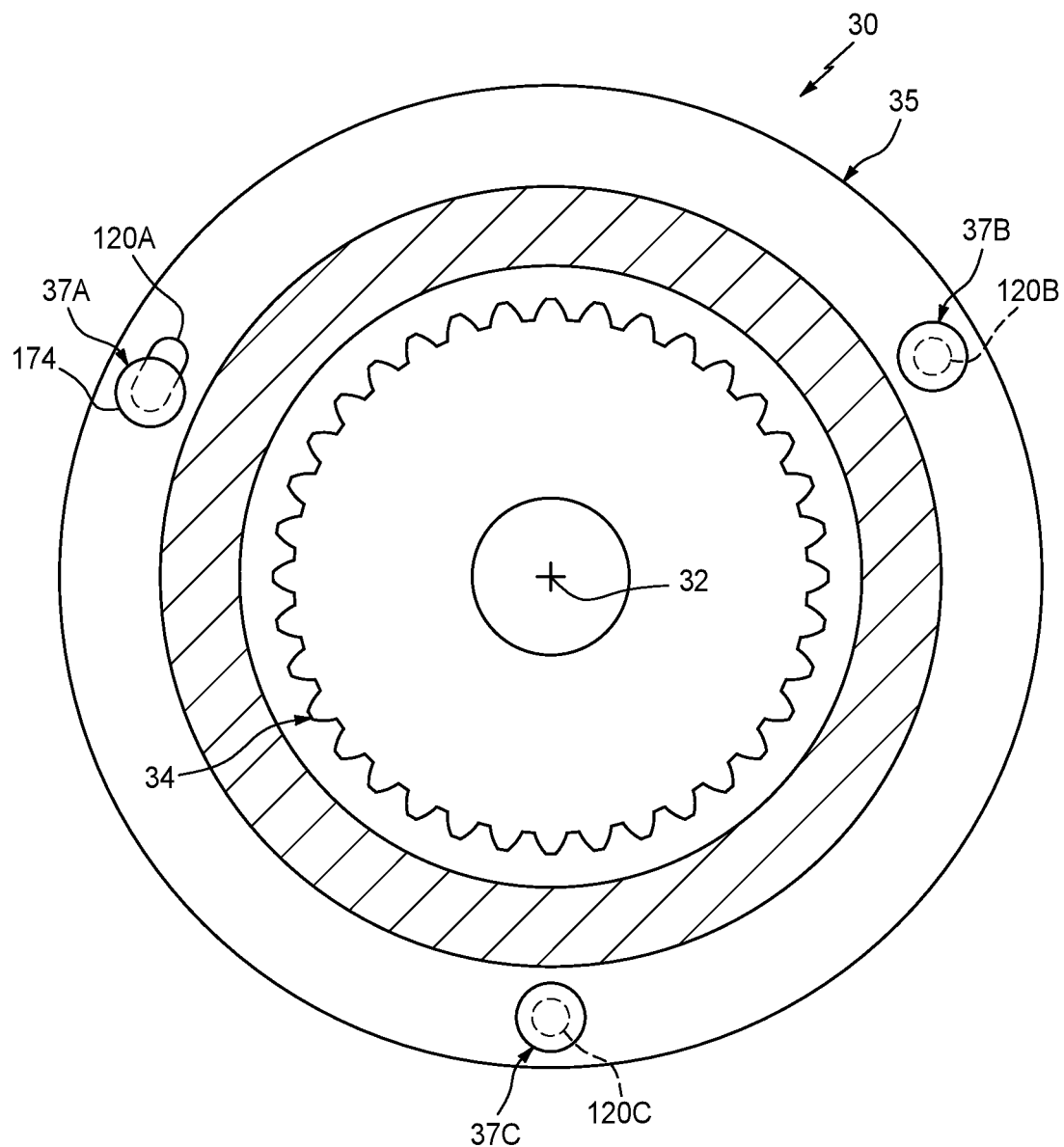
FIG. 23 is a cross-sectional illustration of the splined hub and the splined retainer mounted on the splined shaft with the splined retainer in the locked position.

In step 1412, the splined retainer 36 is fixed (e.g., secured) to the splined hub 35. For example, referring to FIG. 22, the fastener 37A in the hub fastener aperture 120A is completely threaded into the respective retainer fastener aperture 170A. The hub mount 78 may thereby be axially pressed (e.g., preloaded or otherwise engaged) between the head 174 and the splined retainer 36. Referring to FIG. 23, the remaining fasteners 37B and 37C may also be respectively mated with (e.g., inserted into, received within) the hub fastener apertures 120B and 120C and the retainer fastener apertures 170B and 170C (see FIG. 12). These fasteners 37B and 37C may also be respectively completely threaded into the retainer fastener apertures 170B and 170C (see FIG. 12) to further press the hub mount 78 axially between heads of those fasteners 37B and 37C and the splined retainer 36.

With the foregoing arrangement, the meshing between the hub splines 86 and the shaft splines 54 rotationally fixes the splined hub 35 to the splined shaft 34. The seating of the splined retainer 36 and its retainer splines 152 in the undercut 64 axially fixes the splined retainer 36 and, thus, the splined hub 35 via the fasteners to the splined shaft 34. In addition, the foregoing arrangement can also decrease an overall axial length needed for the locking coupling 30. For example, the undercut 64 may be formed (e.g., machined) into a runout portion of the shaft 34 which may be left as an artifact following the formation (e.g., machining) of the shaft grooves 56; see FIGS. 2-4. In another example, positioning the splined retainer 36 against a backside of the hub 35 may allow for configuring the shaft distal end 42 flush with the first ends 92 of the hub splines 86; see FIG. 22.

Figure 24:
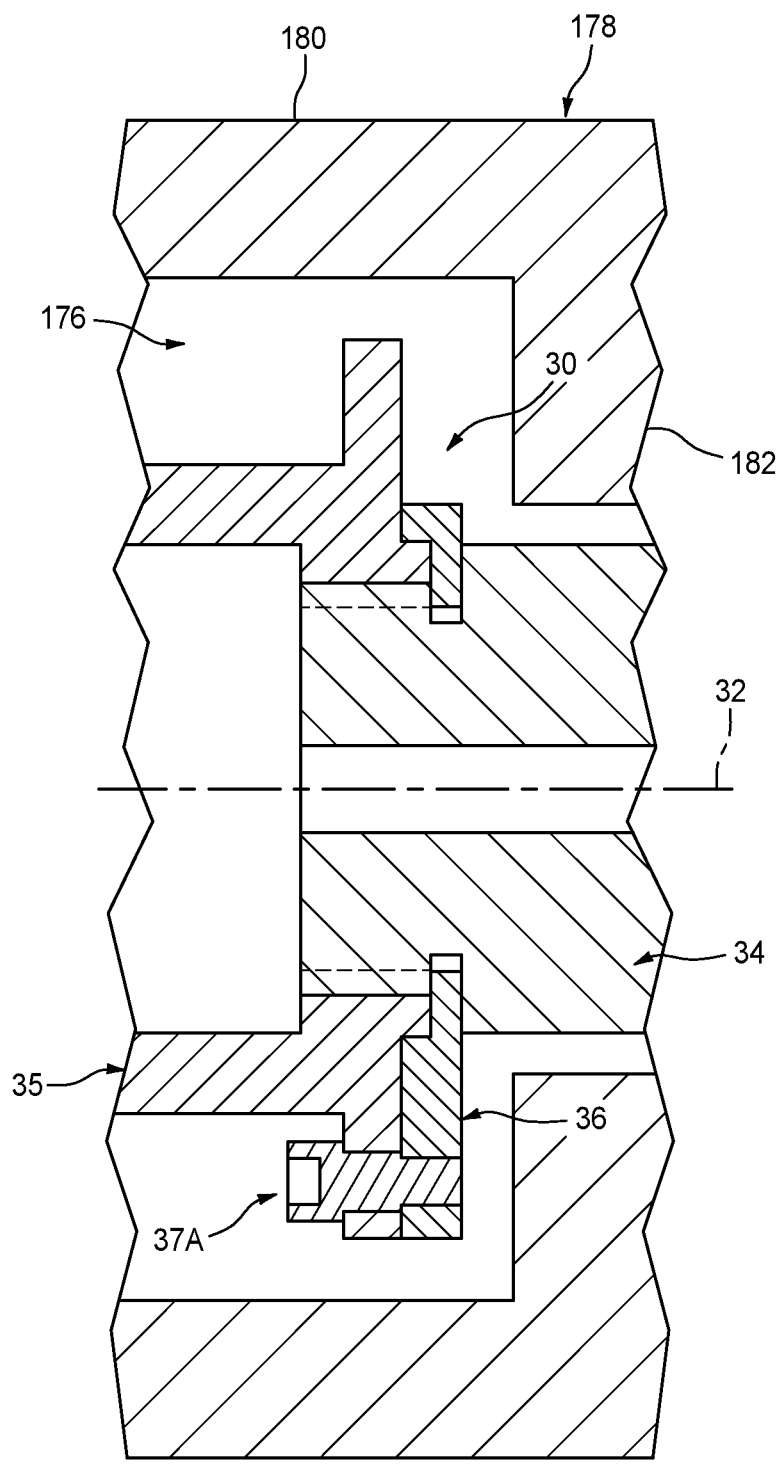
FIG. 24 is a partial sectional illustration of the locking coupling arranged within an internal cavity of a casing.

In some embodiments, the splined retainer 36 may be rotated in the step 1410 using the fastener 37A. For example, the head 174 of the fastener 37A may be used as a handle/tool for turning the splined retainer 36 about the splined shaft 34 and the axis 32. Thus, the splined retainer 36 may be rotated without direct access to the splined retainer 36. The splined retainer 36 may thereby be configured for blind rotation about the splined shaft 34 and the axis 32, axially behind and/or blocked by the splined hub 35 between the unlocked position (see FIG. 20) and the locked position (see FIG. 21). Such an arrangement facilitates assembly of the locking coupling 30 in a limited access environment such as, for example, within a cavity 176 of a casing 178 as shown in FIG. 24. Note, a sidewall 180 of the casing 178 may limit or prohibit radial access to the locking coupling components 34 and 36. An end wall 182 of the casing 178 may limit or prohibit certain axial access to the locking coupling components 34 and 36 from the side of the end wall 182.

In some embodiments, the size (e.g., axial thickness) of the splined retainer 36 and the size (e.g., axial length) of the undercut 64 may be decreased to reduce the total axial length of the locking coupling 30. In other embodiments, the size (e.g., axial thickness) of the splined retainer 36 and the size (e.g., axial length) of the undercut 64 may be increased to strengthen the locking coupling 30. The locking coupling 30 may thereby accommodate higher axial loads than a traditional retaining ring (e.g., snap ring) design.

Figure 25:
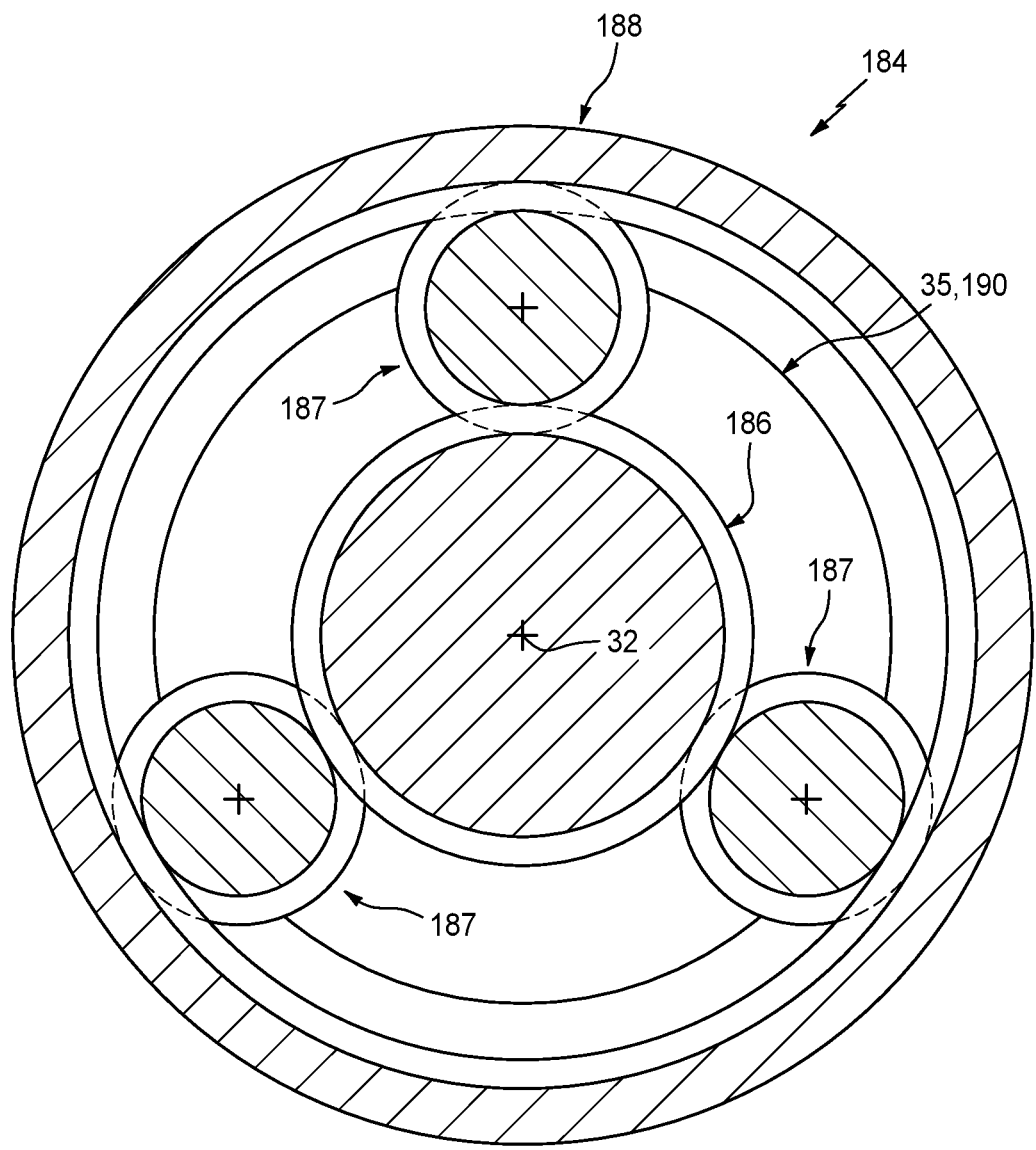
FIG. 25 is a schematic cross-sectional illustration of a geartrain configured with the locking coupling.

FIG. 25 is a schematic illustration of a epicyclic geartrain 184. The epicyclic geartrain 184 may be configured as, but is not limited to, a planetary geartrain, a solar geartrain or a star geartrain. The geartrain 184 of FIG. 25, for example, includes a plurality of gears 186-188 and a carrier 190. The gears include a central sun gear 186, a plurality of planet gears 187 and a ring gear 188. The planet gears 187 are meshed with and arranged circumferentially about the sun gear 186. The planet gears 187 are rotatable mounted to the carrier 190. The ring gear 188 is meshed with and extends circumferentially around the planet gears 187. The carrier 190 of FIG. 25 may be configured as or otherwise include the splined hub 35 described above. In such embodiments, the splined shaft 34 may be configured as a shaft of a pinion gear. The present disclosure, however, is not limited to the foregoing exemplary gear train configuration nor, more generally, to a geartrain application. For example, in other embodiments, the locking coupling 30 may be configured for linking power takeoff (PTO) shafts, driveline shafts or any other mechanically coupled rotatable components.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A coupling, comprising:
    a shaft comprising a plurality of shaft splines, the plurality of shaft splines extending axially along and arranged circumferentially about an exterior of the shaft;
    a hub comprising a plurality of hub splines, a hub bore and a hub fastener aperture, the plurality of hub splines extending axially along and arranged circumferentially about the hub bore, the plurality of hub splines mated with the plurality of shaft splines, and the shaft disposed within the hub bore;
    a retainer comprising a plurality of retainer splines, a retainer bore and a retainer fastener aperture, the plurality of retainer splines extending axially along and arranged circumferentially about the retainer bore, a first of the plurality of retainer splines circumferentially overlapping and axially next to a first of the plurality of shaft splines, and the shaft within the retainer bore; and
    a fastener within the hub fastener aperture and the retainer fastener aperture, the fastener connecting the retainer to the hub, the fastener including a fastener head and a fastener shaft, the fastener shaft projecting axially through the hub fastener aperture and at least partially axially into the retainer fastener aperture, and the fastener hub axially between and engaged with the head and the retainer.

2. The coupling of claim 1, wherein the plurality of retainer splines are configured to mate with the plurality of shaft splines during at least one of assembly or disassembly of the locking coupling.

3. The coupling of claim 1, wherein
    the shaft further comprises a shoulder; and
    the first of the plurality of retainer splines is captured axially between the first of the plurality of shaft splines and the shoulder.

4. The coupling of claim 1, wherein
    the shaft further comprises an undercut; and
    the plurality of retainer splines are seated within the undercut.

5. The coupling of claim 4, wherein
    the undercut projects radially into the shaft; and
    the undercut extends axially and circumferentially within the shaft.

6. The coupling of claim 1, wherein
    the hub fastener aperture has a circular cross-sectional geometry; and
    the retainer fastener aperture has a circular cross-sectional geometry.

7. The coupling of claim 1, wherein
    the hub fastener aperture has an elongated cross-sectional geometry; and
    the retainer fastener aperture has a circular cross-sectional geometry.

8. The coupling of claim 1, wherein an aperture pitch angle of the hub fastener aperture is equal to a spline pitch angle of an adjacent pair of the plurality of retainer splines.

9. The coupling of claim 1, wherein
    the retainer further comprises a counterbore; and
    the hub further comprises a rim seated within the counterbore.

10. The coupling of claim 1, wherein
    a first of the plurality of hub splines has a hub spline circular tooth thickness; and
    the first of the plurality of retainer splines has a retainer spline circular tooth thickness that is equal to the hub spline circular tooth thickness.

11. The coupling of claim 1, wherein at least one of
    an outer periphery of the hub has a circular cross-sectional geometry; or
    an outer periphery of the retainer has a non-circular cross-sectional geometry.

12. The coupling of claim 1, wherein
    the retainer is configured for blind rotation about the shaft, axially behind the hub, between a locked position and an unlocked position;

the first of the plurality of retainer splines circumferentially overlaps and is axially next to the first of the plurality of shaft splines in the locked position; and the first of the plurality of retainer splines is circumferentially aligned with a groove between the first of the plurality of shaft splines and a second of the plurality of shaft splines in the unlocked position.

13. The coupling of claim 1, further comprising a gear train comprising a carrier, and the carrier comprising the hub.

14. A locking coupling, comprising:
a shaft comprising a plurality of shaft splines;
a hub comprising a plurality of hub splines and a hub fastener aperture;
a retainer comprising a plurality of retainer splines and a retainer fastener aperture; and
a fastener comprising a fastener head and a fastener shaft;
the locking coupling configurable in a first arrangement where:
   the hub is mounted on the shaft, and the plurality of hub splines are meshed with the plurality of shaft splines;
   the retainer is mounted on the shaft, and each of the plurality of retainer splines is axially adjacent and circumferentially aligned with a respective one of the plurality of shaft splines; and
   the fastener shaft projecting axially through the hub fastener aperture and at least partially axially into the retainer fastener aperture, and the hub axially between and engaged with the fastener head and the retainer; and
the locking coupling configurable in a second arrangement where:
   the plurality of retainer splines are meshed with the plurality of shaft splines.

15. The locking coupling of claim 14, wherein
the shaft further comprises an undercut axially adjacent the plurality of shaft splines; and
in the first arrangement, the plurality of retainer splines are seated within the undercut.

16. The locking coupling of claim 14, wherein, in the second arrangement, the fastener shaft is within the hub fastener aperture and the retainer fastener aperture.

17. A manufacturing method, comprising:
mounting a hub and a retainer on a shaft, the mounting comprising
   sliding the retainer along the shaft from a retainer first position to a retainer second position, a plurality of retainer splines on the retainer meshed with a plurality of shaft splines on the shaft at the retainer first position, and the plurality of retainer splines axially next to the plurality of shaft splines at the retainer second position;
   rotating the retainer about the shaft from the retainer second position to a retainer third position where each of the plurality of retainer splines circumferentially overlaps a respective one of the plurality of shaft splines; and
   arranging the hub at a hub position where a plurality of hub splines on the hub are meshed with the plurality of shaft splines; and
fixing the retainer to the hub with a fastener where the retainer is in the retainer third position and the hub is in the hub position, wherein the fastener includes a fastener head and a fastener shaft, the fastener shaft projects axially through a hub fastener aperture in the hub and at least partially axially into a retainer fastener aperture in the retainer, and the hub is axially between and engaged with the fastener head and the retainer.

18. The manufacturing method of claim 17, wherein
the shaft further comprises an undercut axially next to the plurality of shaft splines; and
the plurality of retainer splines are within the undercut at the retainer second position and the retainer third position.

19. The manufacturing method of claim 17, further comprising mating the fastener with the retainer fastener aperture and the hub fastener aperture prior to sliding the retainer along the shaft from the retainer first position to the retainer second position.

* * * * *